M. F. WEBB.
GAS VALVE.
APPLICATION FILED MAY 20, 1908.

917,386.

Patented Apr. 6, 1909.

Witnesses:
Joe. P. Wahler.
R. M. Smith.

Inventor:
Marion F. Webb.
By Victor J. Evans,
Attorney.

UNITED STATES PATENT OFFICE.

MARION F. WEBB, OF BIRMINGHAM, ALABAMA.

GAS-VALVE.

No. 917,386.     Specification of Letters Patent.     Patented April 6, 1909.

Application filed May 20, 1908. Serial No. 433,886.

*To all whom it may concern:*

Be it known that I, MARION F. WEBB, a citizen of the United States, residing at Birmingham, in the county of Jefferson and State of Alabama, have invented new and useful Improvements in Gas-Valves, of which the following is a specification.

This invention relates to gas valves, the object of the invention being to provide what may be termed a check valve for use in connection with ordinary gas supply devices, said valve being designed to be used between the meter and the burners in order to resist the back flow of the gas in the pipes so that in refilling the pipes with gas, the meter will not be caused to register the same gas more than once. In certain cities the gas pipes are filled and exhausted several times every day and every time the pipes are refilled, the gas in passing by or through the meters causes said meters to register whether the consumer has used any gas or not. By means of the valve of this invention and this arrangement in the supply pipe, the objection above referred to is overcome and the consumer is protected.

With the above and other objects in view, the nature of which will more fully appear as the description proceeds, the invention consists in the novel construction, combination and arrangement of parts as herein fully described, illustrated and claimed.

Figure 1:
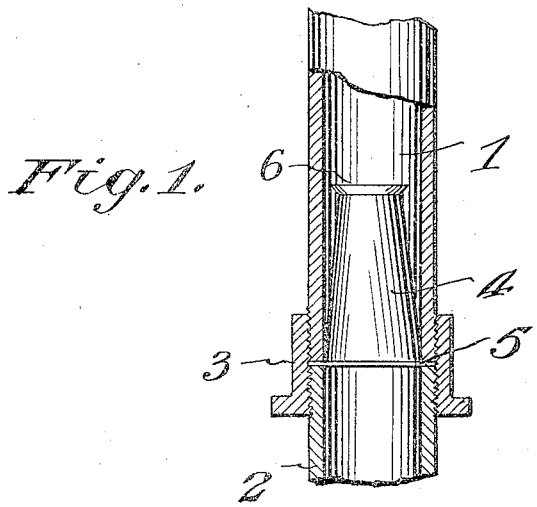
Figure 2:
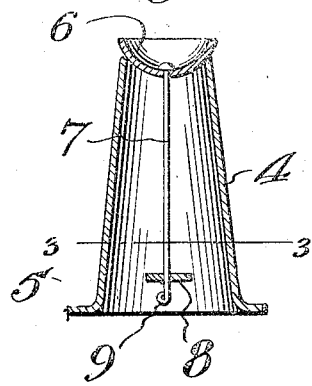
Figure 3:
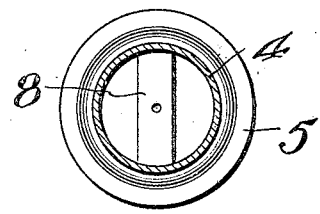

In the accompanying drawings:—Figure 1 is a vertical sectional view of a gas pipe joint, showing the valve mounted therein. Fig. 2 is a longitudinal sectional view of the valve. Fig. 3 is a cross section through the valve on the line 3—3 of Fig. 2.

In the drawings, 1 and 2 designate adjoining sections of gas pipe which are connected by the ordinary union 3 threaded upon the ends of the pipe sections as shown in Fig. 1.

The valve of this invention comprises a body 4 open at both ends while the larger end thereof is provided with a circumferential seating or anchoring flange 5 which is adapted to be clamped between the adjoining extremities of the pipe sections as shown in Fig. 1 and held by means of the union 3 when the latter is screwed up tight. The smaller end of the body 4 forms a valve seat for the reception of a check valve 6 which is preferably of hemispherical shape or concavo-convex form as shown in Fig. 2 with the convex side inward. In other words, the convex surface of the check valve is the working surface thereof which rests in contact with the valve seat. Connected centrally to the valve is a stem 7 which passes slidingly through a combined guide and stop 8 in the form of a cross bar, the opposite ends of which are attached to the body 4 at opposite points as shown in Fig. 3. The extremity of the stem 7 is provided with an enlargement or shoulder 9 which allows only a small limited amount of movement of the valve 6 away from its seat.

The gas in passing through the pipe moves the valve 6 away from its seat and passes onward to the burners. When, however, the gas company exhausts the gas from the system of devices, the valve 6 seats firmly and prevents the company from exhausting the gas which has already passed the meters and for which the consumer is therefore liable.

I claim:—

A valve for the purpose described, comprising a conical or tapering hollow body, a retainer flange at one end thereof, a valve seat formed by the opposite end thereof, a check valve, and means for permitting a limited play of the check valve toward and away from its seat, substantially as described.

In testimony whereof I affix my signature in presence of two witnesses.

MARION F. WEBB.

Witnesses:
    A. L. STAMPS,
    SANSON D. GUNNELS.